United States Patent [19]

Corte et al.

[11] 3,980,462

[45] Sept. 14, 1976

[54] FERTILIZER FOR LONG TERM SUPPLY OF PLANTS WITH CHELATED MICRONUTRIENTS

[75] Inventors: Herbert Corte, Opladen; Harold Heller, Cologne; Peter Michael Lange; Otto Netz, both of Leverkusen, all of Germany

[73] Assignee: Bayer Aktiengesellschaft, Germany

[22] Filed: Jan. 15, 1976

[21] Appl. No.: 649,493

Related U.S. Application Data

[63] Continuation of Ser. No. 490,570, July 22, 1974, abandoned.

[30] Foreign Application Priority Data

July 27, 1973 Germany............................ 2338182

[52] U.S. Cl............................................ 71/1; 71/27; 71/64 G; 71/DIG. 2; 47/1 R
[51] Int. Cl.².......................................... C05F 11/02
[58] Field of Search................... 71/1, DIG. 2, 64 G, 71/27

[56] References Cited

UNITED STATES PATENTS 3,082,074   3/1963   Handley.................................... 71/1

OTHER PUBLICATIONS

Helfferich, McGraw Hill, (Helfferich–Ion Exchange), 1962, pp. 215–222.

Primary Examiner—Frank A. Spear, Jr.
Assistant Examiner—Ferris H. Lander
Attorney, Agent, or Firm—Connolly and Hutz

[57] ABSTRACT

A fertilizer for the long term and uniform supply of plants with micronutrient elements of atomic numbers 24 to 30, comprising at least one anion exchanger charged with anionic chelated ions of at least one element having having an atomic number of from 24 to 30; furthermore a process for the long term and uniform supply of plants with micronutrient ions of elements of atomic numbers 24 to 30, wherein an anion exchanger charged with said ions is applied to the plants or their environment.

5 Claims, No Drawings

FERTILIZER FOR LONG TERM SUPPLY OF PLANTS WITH CHELATED MICRONUTRIENTS

CROSS-REFERENCE TO RELATED APPLICATION

This application is a continuation of application Ser. No. 490,570 filed July 22, 1974 and now abandoned.

This invention relates to fertilizers which contain ion exchangers charged with chelate complexes for the long term and uniform supply of plants with anionic chelate complexes of micronutrients.

To provide optimum growing conditions for a plant, both the macronutrients and the micronutrients must always be available in sufficient quantity in a substrate. It is therefore necessary to compensate for any lack of micronutrient in substrates used for plant cultivation by adding suitable micronutrient fertilizers. Such long lasting and uniform supply with trace elements can be achieved in various ways.

Thus, for example, according to one prior proposal cation exchangers charged with simple ions of trace elements can be used for the long term and uniform supply of plants with micronutrients (see U.S. Pat. No. 3,082,074). Although these charged ion exchangers can be used for effective supply of micronutrients in slightly acidic or neutral substrates, their use in slightly basic soils entails considerable disadvantages. In particular, a substantial proportion of the multivalent metal ions, especially the ions of iron, remain unused because once these ions have become detached from the exchanger they precipitate in a slightly alkaline substrate in the form of difficulty soluble hydroxides and are therefore no longer available to the plant to a sufficient extent.

According to another prior proposal, plants can be supplied with the elements of atomic numbers 24 to 30 in the form of anionic chelate complexes (see "Organic Sequestering Agents," John Wiley and Sons, Inc., New York, 1959, 455 – 469). For example, anionic iron chelate complexes are suitable for combatting chloroses in citrus fruits (see Proc. Florida State Hart. Soc. 64, 20 (1952); ibid. 66, 49 (1954)). These chelate complexes are soluble in water and can therefore be supplied to the plant as a liquid fertilizer through the leaf. The use of anionic chelate complexes as a soil fertilizer, however, which is in many cases desirable, entails various disadvantages. In particular, it is impossible to prevent substantial quantities of the fertilizer being washed out by rain when used in the soil because soil has only a very low sorption capacity for anionic chelate complexes of aminopolycarboxylic acids. If attempts are made to compensate for these losses by adding substantial quantities of anionic chelates, oversupply of fertilizer is liable to take place, which impairs assimilation by the plants (see Science 120, 41 (1954)).

The disadvantages enumerated above of using anionic chelate complexes in soil fertilizers can be obviated to a certain extent by incorporating the complexes in polyurethane foam before they are added to the soil (see U.S. Pat. No. 3,245,776). But even the use of anionic chelate complexes in this form is not quite satisfactory because long term and uniform supply of the plants with trace elements in practice cannot be perfectly achieved by this method.

It has now been found that anion exchangers which are charged with anionically chelated ions of one or more elements of atomic numbers 24 to 30 are very suitable for the long term and uniform supply of plants with micronutrient ions of elements of atomic numbers 24 to 30.

It is to be regarded as distinctly surprising that the charged anion exchangers according to the invention are substantially better for the long term and uniform supply of plants with micronutrients of elements having atomic numbers of from 24 to 30 than the previously known anionic chelate complex fertilizers or the cation exchangers charged with the required metal ions, which are the nearest equivalent means with a similar action. The excellent properties of the long term fertilizers according to the invention were in no way foreseeable, since it would have been expected that, even when ion exchangers charged with anionic chelate complexes are used, the plants would all too easily be damaged by over-fertilization owing to the ease of exchange of the chelate complexes.

The fertilizers according to the invention have numerous advantages. In contrast to cation exchangers charged with micronutrients, they can be used equally well in slightly acid, neutral and slightly basic substrates for supplying plants with trace elements. There is no risk of multivalent metal cations precipitating in an alkaline substrate in the form of difficulty soluble hydroxides and thus becoming unavailable for use, since the anionic chelates are sufficiently stable to prevent precipitation. Another advantage of the charged ion exchangers according to the invention is that they do not release the nutrients bound to them until the electrolyte content exceeds a certain level, which can be regulated by the water used for spraying the soil. Excessive fertilization with anionic chelate complexes, which would be harmful to the plants, can thereby be avoided. The fertilizers according to the invention therefore ensure optimum utilization of the micronutrients supplied, combined with a continuous supply of the plants with trace elements of atomic numbers 24 to 30 in amounts adjusted to the individual requirements. They therefore constitute a valuable contribution to the art.

The anion exchangers used according to the invention may be, for example, copolymers obtained by the copolymerization of aromatic vinyl monomers or acrylic acid derivatives with polyvinyl compounds, and into which basic ion exchanging groups such as primary, secondary, tertiary or quaternary amino groups are introduced. The following are examples of aromatic vinyl monomers: styrene, substituted styrenes such as methyl styrene, dimethylstyrene, ethyl styrene, chlorostyrene, vinylanisole, p-vinylbenzylamine, a-methylstyrene and vinylnaphthalene.

The following are examples of suitable acrylic acid derivatives: acrylic acid esters, acrylonitrile, methacrylic acid esters and methacrylonitrile.

The following are examples of suitable polyvinyl compounds: divinylbenzene, divinyltoluenes, divinylnaphthalenes, dialkylphthalate, ethylene glycol diacrylate, ethylene glycol dimethacrylate, divinylxylene, divinylethylbenzene, trivinylbenzene, trivinylnaphthalene and trivinylcyclohexane.

The preparation of copolymers capable of anion exchange is already known. It may suitably be carried out by suspension polymerization, optionally followed by introduction of amino groups (see U.S. Pat. Nos. 2,675,359, 3,637,535, 3,716,482 and 3,006,866 and British Pat. No. 900,037).

The anion exchangers which may be used according to the invention also include condensation resins which contain basic groups capable of anion exchange. Condensation resins of this kind are generally prepared by condensation of aliphatic or aromatic amines with epichlorohydrin or formaldehyde. The aliphatic amines used may be, for example, polyalkylenepolyamines such as diethylene triamine, triethylene tetramine or pentaethylene hexamine as well as polyethyleneimine. An example of a suitable aromatic amine is m-phenylene diamine. The preparation of such condensation resins which exchange anions is already known (see British patent specification No. 698,353 and U.S. Pat. No. 2,389,865).

The anion exchangers are charged with anionic chelated ions of one or more elements with atomic numbers of from 24 to 30. The term "anionic chelated ions" in this context means negatively charged chelate complexes of metal cations. The preparation of such chelate complexes from metal cations and chelate forming agents is already known.

Elements of atomic numbers 24 to 30 include the metals: chromium, manganese, iron, cobalt, nickel, copper and zinc.

The chelate forming agents used according to the invention may be aminopolycarboxylic acids, in particular the following:

nitrilotriacetic acid,
ethylene diamino-tetracetic acid,
diethylene-triamine pentacetic acid,
N-$\beta$-hydroxyethyl-ethylenediamine-triacetic acid,
cyclohexane-trans-1,2-diamino-tetracetic acid,
ethylenediamine-N,N'-di-(o-hydroxyphenyl)-acetic acid,
N,N'-di-$\beta$-hydroxyethyl-ethylenediaminodiacetic acid,
Bis-(dicarboxymethyl-aminomethyl)-ether, and
Bis-(dicarboxymethyl-aminomethyl)-sulphide.

The chelate forming agents which may be used according to the invention are known in the literature.

The anion exchanger is charged by the usual methods, for example by adding a 0.1 to 10% aqueous solution of a chelate forming agent in the form of the free acid or a salt to the anion exchanger in the form of the free base or a salt at temperatures of from 10° to 70°C with stirring, and then adding a 0.1 to 10% aqueous solution of a trace element salt or mixture of trace element salts to the mixture. When equilibrium has been established, the anion exchanger charged with anionic chelate complexes is separated from the solution and washed with desalted water. Alternatively, the anion exchanger may be charged by mixing it in a similar manner with a previously prepared aqueous solution of an alkali metal salt of the metal chelate. Another particularly advantageous method of charging the anion exchanger comprises filtering a 0.1 to 10% aqueous solution of an alkali metal salt of a metal over it at a moderate velocity in a filter tube. 0.1 to 100% and preferably 1 to 50% of the total capacity of the anion exchanger are generally charged with anionic chelate complexes of ions of the elements having an atomic number of from 24 to 30 by this method.

According to a special, particularly suitable method, the anion exchanger may first be only partly charged with anionic chelate complexes of the trace element ions and then saturated with other macro and/or micronutrients, such as nitrate ($NO_3^-$), dihydrogenphosphate ($H_2PO_4^-$), molybdate ($MoO_4^{--}$) and borate ($BO_3^{---}$).

When the anion exchanger has been charged by one of the methods described above, it may if desired also be mixed with conventional cation exchangers which are charged with nutrient cations of the elements potassium, magnesium or calcium, or with ammonium ($NH_4^+$).

The ion exchangers charged with various anionic chelate complexes or with free nutrient ions are advantageously used in admixture. They are suitable for the long term and uniform supply of both useful plants and ornamental plants.

The useful plants include e.g., citrus fruits, cherries (Prunus), peach (Prunus persica) and grape vine (vitis).

The following are examples of suitable ornamental plants:

Aechmea (Aechmea fasciata), ivy (Hedera helix), croton (codiaeum variegatum), palm (Chamaedorea elegans), philodendron (Philodendron red emerald; philodendron scandens, monstera deliciosa, euphorbias (Euphorbia pulcherrima), ferns (Adiantum scutum roseum), rubber tree (Ficus elastica decora, Ficus robusta, Ficus diversifolia, Ficus benjamina), aphelandra (Aphelandra squarrosa dania), maranta (Maranta makoyana), chrysanthemums (Yellow Delaware), anthurias (Anthurium scherzerianum), ericaceas (Erica gracilis), azaleas (Rhododendron simsii), dieffenbachias (Dieffenbachia amoena; tropic white), dracaenas (Dracaena terminalis, Dracaena deremensis), hibiscus (Hibiscus rosa-sinensis), lady's slipper (Cypripedium), guzmanias (Guzmania minor), pachystachys (Pachystachys), peperomia (Peperomia glabella), stag horn fern (Platycerium alcicorne), scindapsus (Scindapsus aureus), spatiphyllum (Spatiphyllum wallisii) and vriesea (Vriesea splendens).

The fertilizers according to the invention may be added to or incorporated in various natural and synthetic substrates in which plants can grow. They are particularly advantageous for use as fertilizers in hydrocultures.

The fertilizers according to the invention may also be introduced into synthetic resin wrappings and used as sandwich fertilizers. These sandwich fertilizers have an advantage over fertilizers which are incorporated in the substrate in that they can easily and quickly be replaced and the exhausted ion exchanger can be regenerated without adding salt to the plant.

The fertilizers according to the invention may be used either as such or mixed with other fertilizers, extenders, emulsifiers and/or plant protective agents.

The fertilizers according to the invention may be used in the form of pellets, granulates or powders. They may be applied by the usual methods of agriculture and horticulture. For example, they may be mixed with the natural or synthetic substrate or worked into the soil by digging or plowing. They may also be scattered as top fertilizer on the plants or their surroundings.

The quantity in which the ion exchangers charged according to the invention are used may vary over a wide range and depends mainly on the nutrient requirement of the plants. It is generally from 0.001 to 0.1 liter per liter of culture medium, preferably from 0.002 to 0.05 liters per liter of culture medium.

The charging of ion exchangers with anionic chelate complexes and the application and action of the fertilizers according to the invention will be explained with the aid of the following examples, in which all percentages are by weight.

EXAMPLE 1

1000 ml of pellets of a so-called medium basic anion exchanger prepared by condensation of triethylene tetramine with epichlorohydrin are introduced into a filter tube in the form of the hydrochloride, and 20 liters of a 1.5% aqueous solution of the potassium salt of an ethylene diamine-di-(o-hydroxyphenyl)-acetic acid-iron(III)-chelate complex are filtered over it. The ion exchanger is thereby charged with the iron-(III)-chelate complex until saturated and it is then washed with salt-free water to remove excess chelate complex solution. The charged anion exchanger obtained in this way contains 6 g of iron per liter.

EXAMPLE 2

A strongly basic anion exchanger is prepared from a macroporous methyl acrylate polymer cross-linked with 5% of divinylbenzene and 3% of trivinylcyclohexane by aminolysis with N,N-dimethyl-propylene-1,3-diamine followed by quaternisation with methyl chloride. 1000 ml of pellets of the exchanger are introduced into a filter tube, and 20 liters of a 1.5% aqueous solution of the potassium salt of ethylenediamine-di-(o-hydroxyphenyl)-acetic acid-iron-(III)-chelate complex are filitered over it. The ion exchanger is thereby charged with the iron-(III)-chelate complex until saturated, and it is then washed with salt-free water to remove excess chelate complex solution. The charged anion exchanger contains 8.5 g of iron per liter.

EXAMPLE 3

1000 ml of pellets of a weakly basic anion exchanger, which was prepared from a macroporous methyl acrylate polymer cross-linked with 5% of divinylbenzene and 3% of trivinylcyclohexane by aminolysis with N,N-dimethyl-propylene-1,3-diamine, are introduced into a filter tube and 10 liters of a 2.9% solution of the copper chelate complex of ethylene diaminotetracetic acid are filtered over it. The exchanger is then washed with salt-free water. The charged anion exchanger contains 34.2 g of copper per liter.

EXAMPLE 4

10 Liters of a 2.5% aqueous solution of the copper chelate complex of nitrilotriacetic acid are added at room temperature to 1000 ml of the weakly basic anion exchanger of Example 3 with stirring. When equilibrium has been established, the ion exchanger now charged with copper chelate complex is separated and washed with salt-free water. The charged anion exchanger contains 43.4 g of copper per liter.

EXAMPLE 5

15 Liters of a 2.5% aqueous solution of the manganese-(II)-chelate complex of ethylenediaminotetracetic acid are added at room temperature to 1000 ml of the weakly basic anion exchanger of Example 3 with stirring. When equilibrium has been established, the anion exchanger charged with manganese-(II)-chelate complex is separated and washed with salt-free water. The charged anion exchanger contains 35 g of manganese per liter.

EXAMPLE 6

50 ml of pellets of an aminomethylated styrene polymer which has been cross-linked with 2% of divinylbenzene and which contains 1.8 aminomethyl groups per styrene unit are introduced into a filter tube, and 2 liters of a 1.8% aqueous solution of the zinc chelate complex of ethylene diaminotetracetic acid are filtered over it. The charged ion exchanger is then washed with salt-free water to remove excess chelate complex solution. The charged anion exchanger contains 60 g of zinc per liter.

EXAMPLE 7

1.5 Liters of a 2.4% aqueous solution of the cobalt chelate complex of ethylenediaminotetracetic acid are added at a temperature of 60°C to 60 ml of the anion exchanger described in Example 6 with stirring. When equilibrium has been established, the anion exchanger charged with cobalt chelate complex is separated and washed with salt-free water. The charged anion exchanger contain 45 g of cobalt per liter.

EXAMPLE 8

10 Liters of a 3.6% solution of the nickel chelate complex of ethylene diaminotetracetic acid are added at a temperature of 50°C with stirring to 1000 ml of a macroporous weakly basic anion exchanger which contains tertiary amino groups. The anion exchanger has been prepared by amino-methylating and then methylating with a mixture of formaldehyde and formic acid a styrene polymer which had been cross-linked with 8% of divinylbenzene and made porous by the addition of 60% (based on the monomer mixture) of a $C_{12}$ hydrocarbon mixture. The mixture of anion exchanger and chelate complex is stirred for 8 hours at 50°C to establish equilibrium. The anion exchanger charged with nickel chelate complex is then separated and washed with salt-free water. The charged anion exchanger contains 26.3 g of nickel per liter.

EXAMPLE 9

One embodiment of the process according to the invention is carried out as follows for producing a full component fertilizer which is suitable for supplying plants in soil cultures or soil-free cultures with anionic chelate complexes of ions of the trace elements iron, manganese, copper and zinc:

20 Liters of pellets of an aminomethylated styrene polymer which has been cross-linked with 4% of divinylbenzene and which contains 1.0 aminomethyl groups per styrene unit are suspended in water and the following are then added successively with stirrings:

700 g of phosphoric acid,
10 g of boric acid,
335 g of ethylenediaminotetracetic acid,
240 g of $FeSO_4 . 7 H_2O$,
24 g of $MnSO_4 . H_2O$,
18 g of $CuSO_4 . 5 H_2O$,
6 g of $ZnSO_4 . 7 H_2O$
9 g of ammonium molybdate, and
3800 g of nitric acid.

8 Liters of the potassium form or ammonium form of a cation exchanger, prepared by sulphonating a polystyrene which has been cross-linked with 6% of divinylbenzene, are added to this charged anion exchanger. The resulting fertilizer mixture was used for fertilizing hydrocultures in a quantity of 300 ml per m². This quantity was sufficient to ensure supply of nutrient to the following plants for 8 months without signs of deficiency:

Aechmea (*Aechmea fasciata*), anthuria (*Anthurium scherzerianum*), aphelandra (*Aphelandra squarrosa dania*), palm (*Chamaedorea elegans*), Croton (*Codiaeum variegatum*), lady's slipper (*Cypripedium*), dieffenbachias(*Dieffenbachia tropic white*), dracaenas (*Dracaena deremensis*), rubber tree (*Ficus robusta; Ficus diversifolia; Ficus benfamina*), guzmanias (*Guzmania mino*), ivy (*Hedera helix*), hibiscus (*Hibiscus rosa sinensis*), philodendron (*Philodendron red emerald; Monstera deliciosa; Philodendron scandens*), pachystachys (*Pachystachys*), peperonia (*Peperonia glabella*), stag horn fern (*Platycerium alcicorne*), scindapsus (*Scindapsus aureus*), spatiphyllium (*Spatiphyllium vallisii*) and Vriesea (*Vriesea splendens*).

Ordinary tap water was used for spraying. Expanded clay was used as a filler substrate.

EXAMPLE 10

A weakly basic anion exchanger prepared by chloromethylating and then aminating with methylamine a polystyrene which had been cross-linked with 2% of divinylbenzene was used for the application described below.

200 Liters of the nitrate form of this anion exchanger were suspended in water and charged at room temperature with stirring with an aqueous solution of 100 mol of the monosodium salt of the ethylenediaminotetracetic iron-(III)-chelate complex and 10 mols of the sodium salt of the ethylene diaminotetracetic manganese-(II) chelate complex.

A single administration of 50 ml per $m^2$ was sufficient to eliminate the widespread signs of chlorosis which, owing to the alkaline soil, had appeared in roses cultivated for cut flowers in green houses. The damage was not observed again within a year after application.

Equally good results are obtained in pot cultures of citrus, calamondin and *Gardenia Jasminoides*.

We claim:

1. A process for the long term and uniform supply of plants with micronutrient ions of elements of atomic numbers 24 to 30, wherein an anion exchanger charged with anionic chelated ions of at least one element of the group consisting of elements having an atomic number of from 24 to 30 is applied to the plants or their environment as fertilizer.

2. The process of claim 1 wherein the fertilizer is applied in an amount of 0.001 to 0.1 liter per liter of culture medium.

3. The process of claim 1 wherein the anion chelated ions are iron and manganese.

4. The process of claim 1 wherein the anion exchanger is charged from 0.1 to 100% of its total capacity with the anionic chelated ions.

5. The process of claim 1 wherein the anion exchanger is charged with 0.1 to 50% of its total capacity with the anionic chelated ions.

* * * * *